US012645686B1

(12) United States Patent
Banzhaf et al.

(10) Patent No.: US 12,645,686 B1
(45) Date of Patent: Jun. 2, 2026

(54) CONTEXTUAL RESPONSE RETRIEVAL USING MODULAR ENDPOINTS

(71) Applicant: T-Mobile USA, Inc., Bellevue, WA (US)

(72) Inventors: Caleb Banzhaf, Monroe, WA (US); Jie Hui, Mercer Island, WA (US); Soojin Hwang, Bellevue, WA (US); Qianwen Wen, Herndon, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/969,205

(22) Filed: Dec. 4, 2024

(51) Int. Cl.
*G06F 16/2457* (2019.01)
*G06F 9/54* (2006.01)
*G06F 16/21* (2019.01)
*G06F 16/248* (2019.01)

(52) U.S. Cl.
CPC ........ *G06F 16/24578* (2019.01); *G06F 9/547* (2013.01); *G06F 16/212* (2019.01); *G06F 16/24575* (2019.01); *G06F 16/248* (2019.01)

(58) Field of Classification Search
CPC ............. G06F 16/24578; G06F 16/212; G06F 16/24575; G06F 16/248; G06F 9/547
See application file for complete search history.

(56) References Cited

U.S. PATENT DOCUMENTS 8,135,694 B2    3/2012   Towers et al.
8,135,860 B1    3/2012   Brown et al.
9,704,230 B2    7/2017   Hofmann et al.
9,910,685 B2    3/2018   Desineni et al.
9,953,350 B2    4/2018   Pugazhendhi et al.
10,264,215 B1   4/2019   Sadanand
10,650,422 B1   5/2020   Benkreira et al.
11,954,794 B2   4/2024   Gelfenbeyn et al.
12,135,740 B1   11/2024  Yu et al.
2009/0300503 A1  12/2009  Suhm et al.
2011/0154212 A1  6/2011   Gharpure et al.
2013/0173428 A1  7/2013   Moser
2014/0053099 A1  2/2014   Groten
2019/0236844 A1  8/2019   Balasian et al.
2023/0156427 A1  5/2023   Majdabadi et al.
2023/0281228 A1  9/2023   Vertsel et al.
2024/0095463 A1  3/2024   Leary et al.
(Continued)

FOREIGN PATENT DOCUMENTS

CN      113448434 A    9/2021
EP       1652029 A2    5/2006
(Continued)

*Primary Examiner* — Jay A Morrison
(74) *Attorney, Agent, or Firm* — Perkins Coie LLP

(57) ABSTRACT

Systems and methods for retrieving information using a modular endpoint system are disclosed herein. The system accesses a suite of model-based agents that interface with a plurality of retrieval augmented generation (RAG) endpoints and receives, from a user via an application programming interface (API), (a) a query and (b) session parameters. The system may input the query and the session parameters into a model configured to identify at least one RAG endpoint and, responsive to identifying the at least one RAG endpoint, retrieve a schema specific to the at least one RAG endpoint. Using the function calling capabilities of the model, the system may generate a request for data conforming to the schema and retrieve the data.

20 Claims, 8 Drawing Sheets

(56) References Cited

U.S. PATENT DOCUMENTS

| | | | |
|---|---|---|---|
| 2024/0143291 | A1 | 5/2024 | Pallapolu et al. |
| 2024/0346256 | A1 | 10/2024 | Qin |
| 2024/0346566 | A1 | 10/2024 | Qin |
| 2024/0354321 | A1 | 10/2024 | Kundel et al. |

FOREIGN PATENT DOCUMENTS

| | | | |
|---|---|---|---|
| EP | 2002360 | A2 | 12/2008 |
| EP | 2748795 | A1 | 7/2014 |
| EP | 3028185 | A1 | 6/2016 |
| EP | 3886112 | A1 | 9/2021 |
| JP | 2020191076 | A | 11/2020 |
| KR | 102466489 | B1 | 11/2022 |
| WO | 2013101903 | A2 | 7/2013 |
| WO | 2016110775 | A1 | 7/2016 |
| WO | 2017200962 | A1 | 11/2017 |
| WO | 2018183364 | A1 | 10/2018 |
| WO | 2019150321 | A1 | 8/2019 |
| WO | 2020120180 | A1 | 6/2020 |

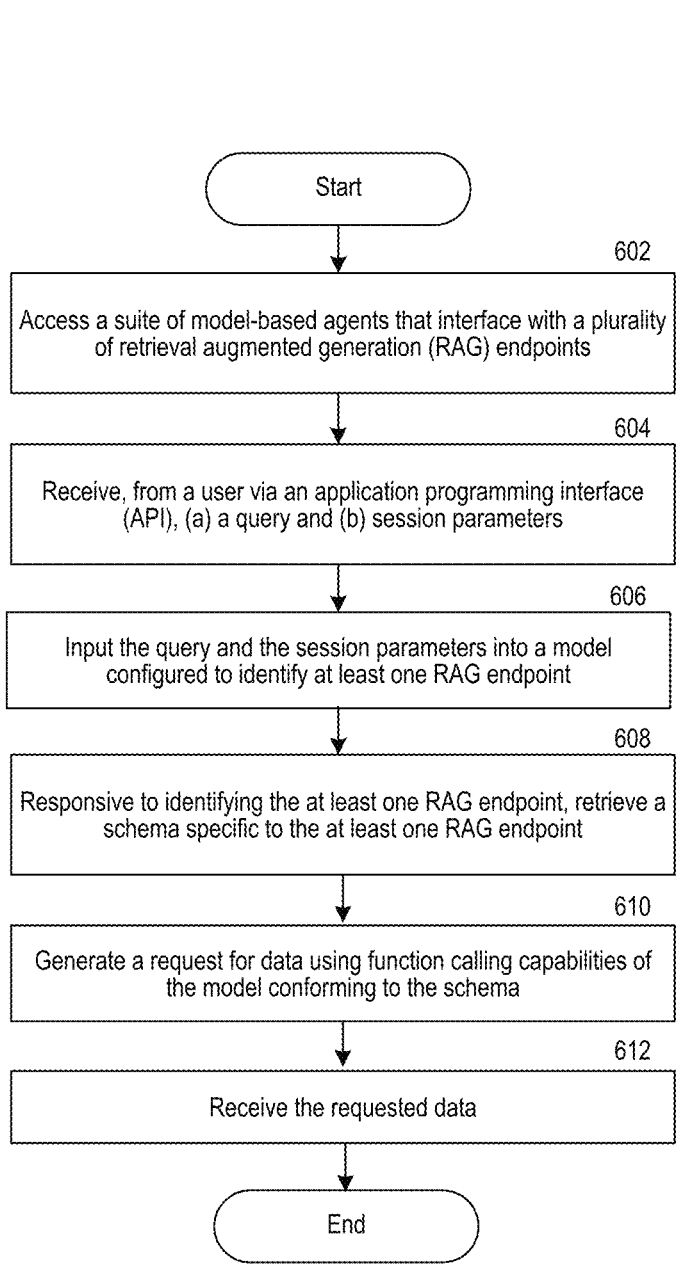

600

Start

602

Access a suite of model-based agents that interface with a plurality of retrieval augmented generation (RAG) endpoints

604

Receive, from a user via an application programming interface (API), (a) a query and (b) session parameters

606

Input the query and the session parameters into a model configured to identify at least one RAG endpoint

608

Responsive to identifying the at least one RAG endpoint, retrieve a schema specific to the at least one RAG endpoint

610

Generate a request for data using function calling capabilities of the model conforming to the schema

612

Receive the requested data

End

CONTEXTUAL RESPONSE RETRIEVAL USING MODULAR ENDPOINTS

BACKGROUND

A telecommunications network is established via a complex arrangement and configuration of many cell sites that are deployed across a geographical area. For example, there can be different types of cell sites (e.g., macro cells, micro cells, and so on) positioned in a specific geographical location, such as a city, neighborhood, and so on. These cell sites strive to provide adequate, reliable coverage for mobile devices (e.g., smartphones, tablets, and so on) via different frequency bands and radio networks such as a Global System for Mobile (GSM) mobile communications network, a code/time division multiple access (CDMA/TDMA) mobile communications network, a third, fourth, or fifth generation (3G/4G/5G) mobile communications network (e.g., General Packet Radio Service (GPRS/EGPRS), Enhanced Data rates for GSM Evolution (EDGE), Universal Mobile Telecommunications System (UMTS), or long-term evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

Networks like these facilitate data retrieval between devices; however, with growing amounts of content and data available, it is often difficult for users to navigate efficiently to access the correct data. For example, many times data can be extremely context-dependent. Furthermore, using conflicting data that is inconsistent can cause users to come to incorrect conclusions. For example, common problems with chatbots include a shallow understanding of information, inaccurate or misleading information, and integration of data from various topics. Security is also a key issue, as chatbots have recently been under fire for providing protected (e.g., copyrighted) information to those who should not have access to the provided information.

BRIEF DESCRIPTION OF THE DRAWINGS

Detailed descriptions of implementations of the present invention will be described and explained through the use of the accompanying drawings.

FIG. 6 is a flow diagram illustrating a process for contextual response retrieval using endpoints, in accordance with embodiments herein.

Figure 1:
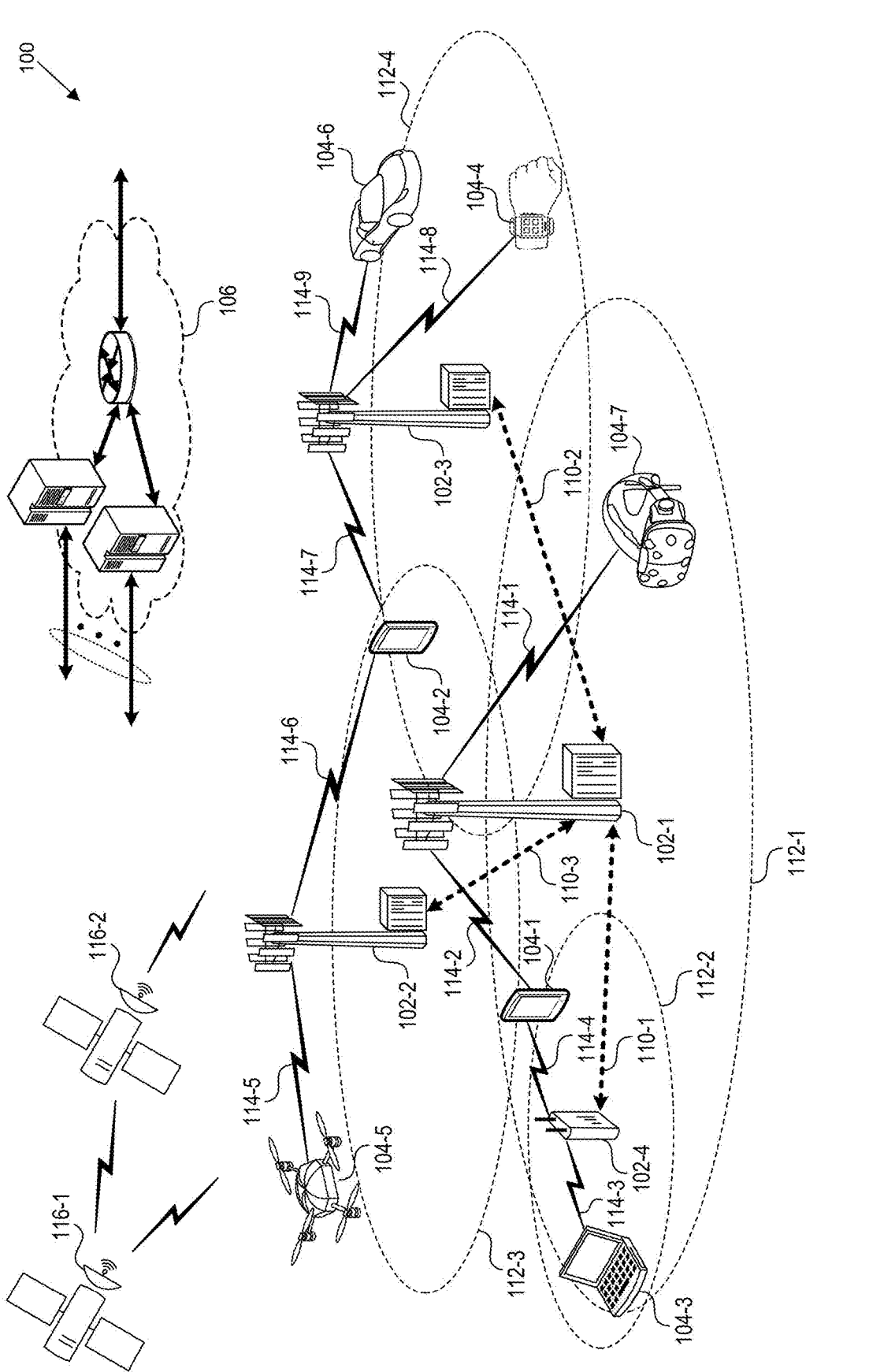
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Data retrieval is a fundamental component of daily operations across a wide breadth of applications. For instance, accurate data retrieval can be crucial in decision-making processes, such as those involving medical treatments, where informed choices are directly linked to positive outcomes. The integration of virtual assistants (e.g., chatbots) has significantly enhanced access to vast amounts of information, facilitating more efficient decision-making processes. However, while they provide a convenient access point for information, such programs often have problems with context switching and providing rich responses.

Data is typically stored in multiple locations, e.g., fragmented across different repositories, making it exceedingly difficult to determine a way to access and synthesize accurate responses by integrating relevant information from across a large breadth of data responsive to a user's query. This problem is often compounded when considering the complex relationships between associated information in different repositories, as well as user clearance for accessing different data, and also considering that data that is retrieved can be out of date or inconsistent. For many entities that host application programming interfaces (APIs) through which users query large amounts of stored information, it is often difficult to navigate through different repositories. As a result, the data is typically segmented by topic and the interdependent nature of the different types of data can be lost. However, in many cases the complex relationships between topics in data can be crucial for providing context-rich, relevant responses.

In some applications, retrieval augmented generation (RAG) endpoints or models can be used to enhance a generative model's responses with information retrieved from a large-scale dataset and can improve accuracy, detail, and relevance of a user's query. In a system that uses RAG-based techniques to identify data relevant to a query or to enhance generative model outputs (referred to herein as a "RAG system"), a vector search is performed to identify content items that are similar to a user's query based on a similarity metric between a vector (e.g., an embedding) representing the query and vectors representing the content items. However, typical methods of using RAG endpoints and models have several issues. For example, typically a user's query is input directly into a RAG endpoint, and the RAG system takes the user's query and performs a vector search across a large collection of documents to identify the most relevant passages or pieces of information related to the query. While this works for some user queries, using typical methods fails where a query requires understanding complex relationships or multi-step reasoning, as the simple retrieval of documents may not provide enough context or detail for the model to produce a correct answer. In particular, if the RAG endpoint is asked a question such as "What is the cheapest iPhone with 5G?" simply using embeddings, the system will fail to provide an accurate response because the question involves a combination of different factors, such as price and specific technology like 5G, and involves a number of steps, such as identifying iPhones that support 5G, comparing their prices, and then determining which one is the cheapest. A RAG system typically retrieves information based on semantic similarity between the query and content in its knowledge base. If the knowledge base has separate pieces of information—one document listing iPhones with 5G and another with prices—the RAG system would be unable to integrate this data.

Furthermore, with RAG systems, scalability is another concern. RAG endpoints can be generalized or specialized. One problem with wide coverage is that, while enabling a broad range of queries to be answered, the vast amount of data makes it harder to retrieve the most relevant information quickly, potentially leading to longer processing times or less precise results. Furthermore, maintaining and updating a large knowledge base can be resource-intensive, requiring significant storage, indexing, and curation efforts. A broad base may include extraneous information that could lead to less accuracy in responses. However, specialized RAGs also have many issues, such as limited scope. For example, the system may not perform well outside its specialized domain and fail to handle queries outside its specialized domain.

For many large entities hosting or having access to large amounts of data, it is too resource-intensive to have a generalized RAG endpoint; however, specialized RAG endpoints run the risk of queries falling out of the specialized domains associated with them. Accordingly, a structure and a mechanism are desired that enables context-rich, relevant responses by leveraging RAG systems that are better able to generate accurate, relevant responses to complex queries that may require data from various topics.

In particular, systems and methods disclosed herein enable a model to leverage a plurality of modular RAG endpoints interfacing with a model-based agent (e.g., large-language model (LLM)-based agents). As described herein, a model-based agent can include a model capable of interfacing with a plurality of RAG endpoints. In addition, a model-based agent may integrate with other systems, databases, or APIs to perform tasks or retrieve data, such as externally. As used herein, a model and a model-based agent may be used interchangeably as it can be understood that a model-based agent includes at least one model.

The model may preempt the query retrieval and may use the user query to identify relevant RAG endpoints from a plurality of RAG endpoints having access to different knowledge bases (e.g., associated with different topics such as "advertisements," "5G," "phone models," etc.). The model may retrieve a schema comprising a format for requesting data at the endpoint or interacting with the endpoint. For example, the schema may define how to interact with the endpoint, e.g., by specifying inputs that a function at the endpoint can receive, how inputs should be formatted, etc., as compared to embeddings which may include representations of the content itself. The model may then generate a request for data, using function calling capabilities of the LLM, where the request conforms to the schema. The system may integrate information retrieved from each endpoint to generate a response for the user.

Doing so improves the usage of RAG endpoints and prevents the same issues described above from occurring.

Furthermore, in some cases, the model may have access to a data structure that identifies a relationship between the different RAG endpoints and/or their associated knowledge bases. Using the data structure, the model may identify different, additional endpoints to query, or that the model is required to query, based on the strength of the relationship between the knowledge bases, e.g., where the relationship may be identified based on relatedness of the knowledge bases, similarity between the knowledge bases, typical user interaction with both knowledge bases, manual selection by an operator, etc. Doing so enables the system to identify complex relationships between topics in various different ways so that the response that is output is more relevant and rich.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (CNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 gigahertz (GHz) or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., SI interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station as compared to a macro cell and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions, while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (TH) communications. This can support wireless applications that demand ultra-high quality of service (QoS) requirements and multi-terabits per second data transmission in the 6G and beyond era, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged WiFi and core architecture to increase and improve indoor coverage.

5G Core Network Functions

Figure 2:
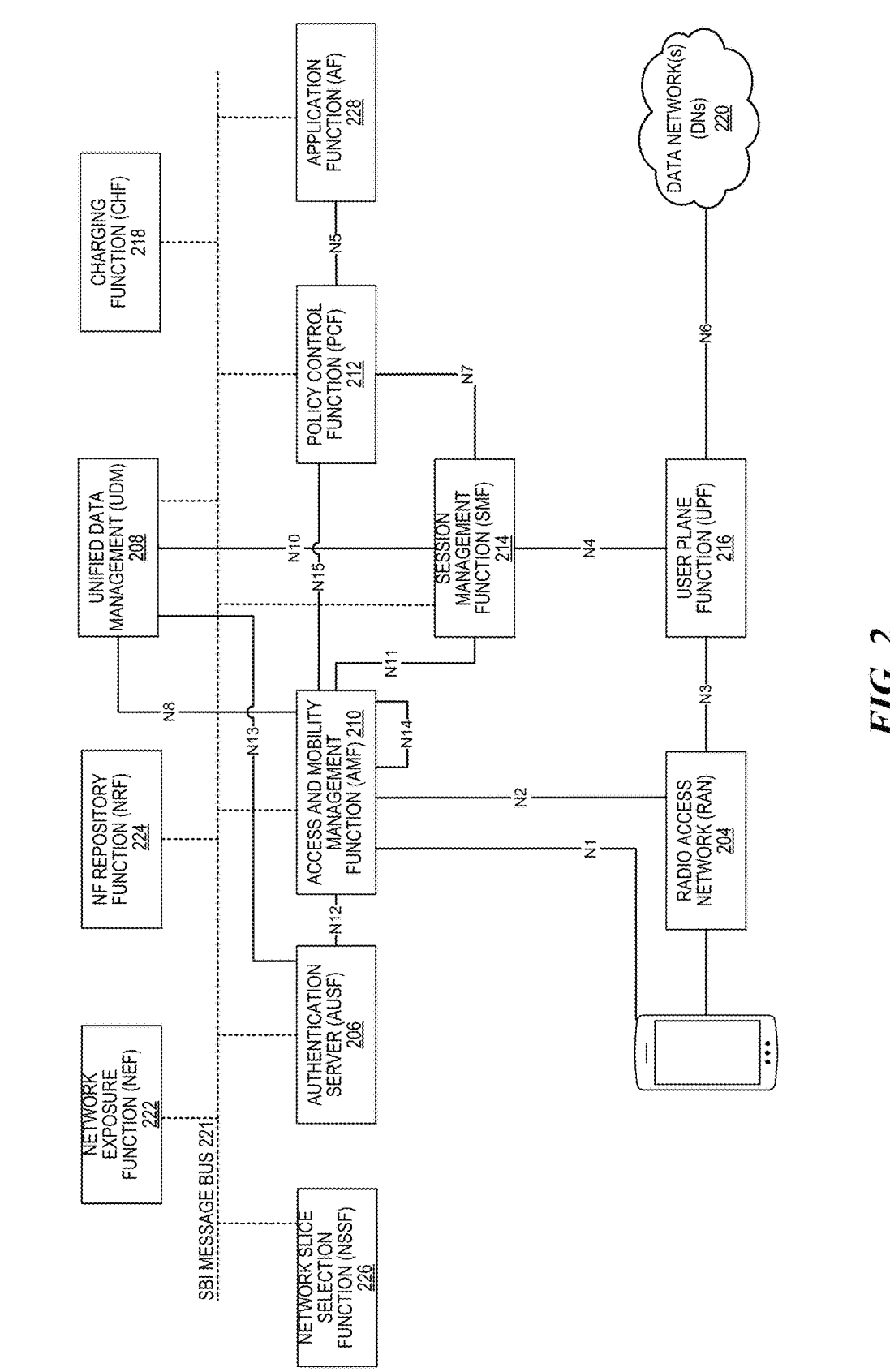
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service-Based Architecture (SBA) through a Service-Based Interface (SBI) 221 that uses Hypertext Transfer Protocol (HTTP)/2. The SBA can include a network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. the wireless device 104 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more application functions (Afs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Although exemplary embodiments are described herein with reference to telecommunications and networks, the concepts of the present invention are not limited in application to such networks. It will be appreciated by those of skill in the art that the concepts of the present invention may be applied outside of telecommunications and networking, such as through a single device or a cluster of remote devices.

Suitable Computing Environments

Figure 3A:
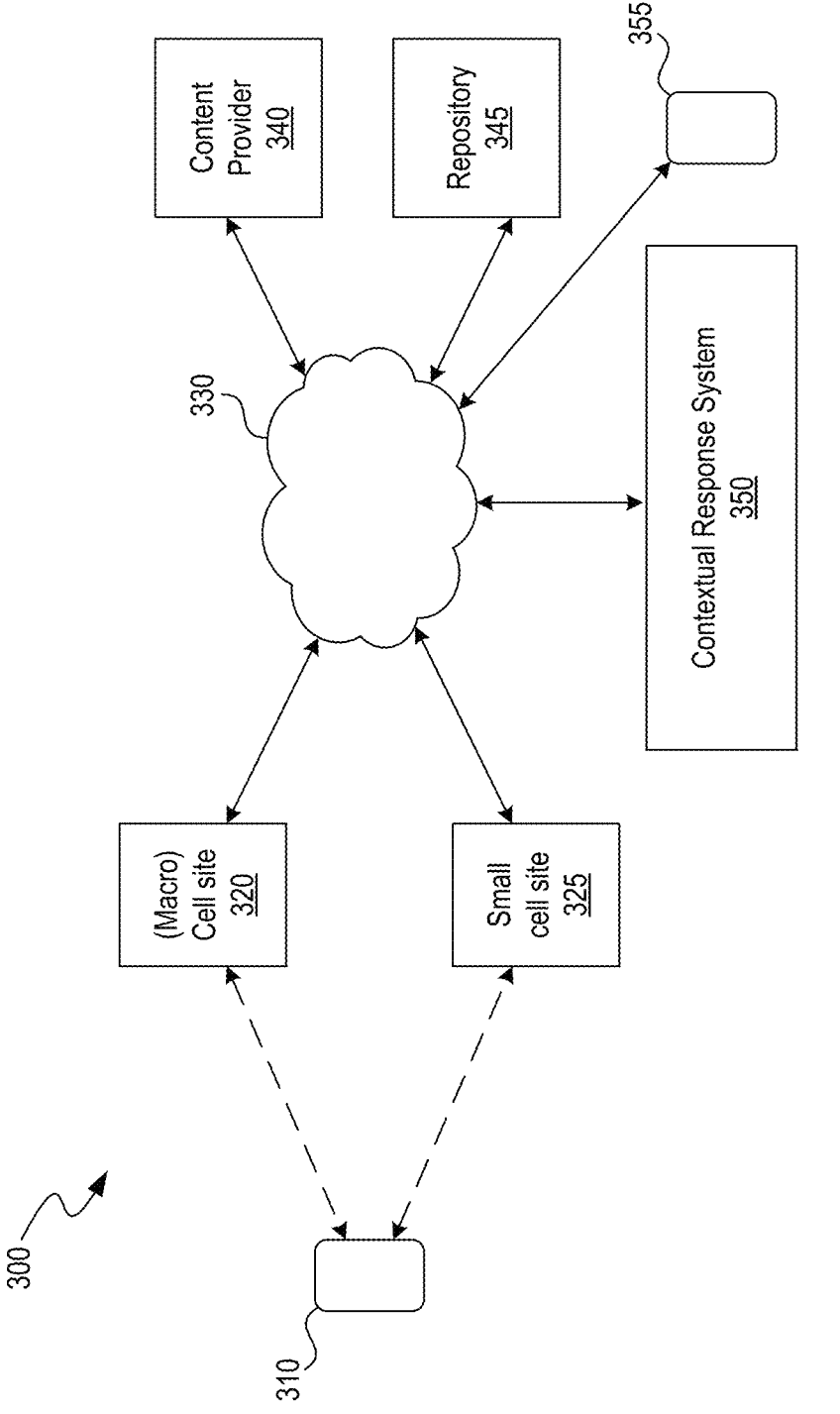
FIG. 3A is a block diagram illustrating a suitable computing environment within which to perform contextual data retrieval, in accordance with embodiments herein.

FIG. 3A is a block diagram illustrating a suitable computing environment within which to perform contextual data retrieval, in accordance with embodiments herein. As described herein, the computing environment 300 of FIG. 3A can be used to retrieve data using modular endpoints, including in some embodiments by identifying relevant bodies of information such that the retrieved data is accurate.

Computing environment 300 can include one or more user device(s) 310, one or more cell sites 320 and 325, telecommunications network 330, content provider 340, cloud data repository 345, one or more other user devices 355, and contextual response system 350. User device(s) 310, such as mobile devices or UE associated with users (such as mobile phones (e.g., smartphones), tablet computers, laptops, and so on), IoT devices, vehicles (e.g., smart vehicles), devices with sensors, and so on, can be configured to receive and transmit data, stream content, and/or perform other communications or receive services over a telecommunications network 330, which is accessed by the user device 310 over one or more cell sites 320, 325. For example, the user device 310 accesses a telecommunications network 330 via a cell site at a geographical location that includes the cell site in order to transmit and receive data (e.g., stream or upload multimedia content) from various entities, such as a content provider 340, content repository 345, and/or other user devices 355 on the telecommunications network 330 and via the cell site 320.

The cell sites can include macro cell sites 320, such as base stations, small cell sites 325, such as pico cells, micro cells, or femto cells, and/or other network access components or sites. The cell sites 320, 325 can store data associated with their operations, including data associated with the number and types of connected users, data associated with the provision and/or utilization of a spectrum, radio band, frequency channel, and so on, provided by the cell sites 320, 325, and so on.

According to some examples, computing environment 300 may be configured to execute and/or otherwise host a platform that includes a group of agents (e.g., LLM-based agents) such as chatbots, that are able to receive user queries and generate responses based on content in a content repository. In some implementations, the platform enables permissioned users to create custom agents. In particular, these agents can be part of the contextual response system 350 or can communicate with contextual response system 350. The agents can receive user inputs (e.g., via an API) and use the contextual response system 350 to identify relevant content and generate a response to the user input, then return the response to the user.

For example, a user may input the query "tell me more on Zoe's ad," referring to an advertisement featuring actress Zoe Saldana. The user's intent may be to learn more information about the promotion that was described in the ad. However, without the correct context, a chat agent may be unable to formulate a correct answer to the question (e.g., failing to correctly identify the details of the promotion) or may answer a question that is different from the user's intent (e.g., describing the scenery of the advertisement or explaining Zoe Saldana's endorsement deal with the company who provided the advertisement). Accordingly, to generate a response to a query, the contextual response system 350 can input the query and the session parameters into a model configured to identify, based on context of the query, at least one modular RAG endpoint configured to retrieve data related to the query. The system may then retrieve a schema comprising a format for requesting data at the RAG endpoint (s), and the machine learning model may then generate one or more requests for data for each of the identified RAG endpoints. The requested data or may be used by the model to generate a contextualized user response. For example, the model can query an advertisement database to identify which ads have featured Zoe Saldana. The model can then call one or more functions at the RAG endpoints, such as filtering the set of ads featuring Zoe Saldana to any that aired in the user's geographical region, filtering the set to any ads that aired within a certain time period (e.g., the last week), or ranking the set of ads to identify the one that is most likely to be relevant to the user. Once an ad has been identified, the contextual response system can use a function at the RAG endpoint to retrieve the details of the promotion described in the identified ad. The promotional details can then be used by the chat agent to formulate a natural language response to the user's query.

As described herein, the contextual response system 350 can utilize a machine learning model, such as an LLM, to identify relevant RAG endpoints from a plurality of RAG endpoints having access to different knowledge bases based on the user query. For example, a user may transmit a query through an API on their user device 310. The system may identify a model, e.g., from a plurality of models, that is suitable for usage and execute the model to identify relevant RAG endpoints by identifying topics and needed information from the endpoints.

In some embodiments, the contextual response system 350 may access a data structure storing data relating to different knowledge bases of the different RAG endpoints. Such a data structure may be used by the contextual response system 350 in order to help identify relevant endpoints to request information from. For example, while the machine learning model may first identify one or more endpoints to request information from, the data structure can be used to identify relevant or required endpoints that bear enough similarity or are relevant.

For example, the data structure may be represented in a graph form, where the knowledge bases are represented as nodes and the edges may represent existence of a relationship between the data in the nodes they bridge. In some examples, the edges may have corresponding values (e.g., text strings, numerals, etc.) that indicate a strength of the relationship of the data. For example, knowledge base "phone plan" may have a stronger relationship with knowledge base "phone cost" than knowledge bases "international eSim," and an edge between the knowledge bases "phone plan" and "phone cost" may thus have a higher value than between knowledge bases "phone plan" and "international eSim."

The contextual response system 350 may retrieve a schema comprising a format for requesting data at the endpoint, such as using the model (e.g., the same model or a different model). The schema may be used to request information from the relevant endpoints. The model may then generate a request for data, using function calling capabilities of the LLM, where the request conforms to the schema specific to the identified endpoints. The system may integrate information retrieved from each endpoint to generate a response for the user.

As described herein, a RAG endpoint can refer to a component in a system designed to enhance the responses of a language model by incorporating relevant external information, e.g., by searching a database or knowledge base (e.g., documents, web pages, or other text corpora) to find relevant information relating to a user's query.

FIG. 3A and the discussion herein provide a brief, general description of a suitable computing environment 300 in which the contextual response system 350 can be supported and implemented. Although not required, aspects of the contextual response system 350 are described in the general context of computer-executable instructions, such as routines executed by a computer, e.g., a mobile device, a server computer, or a personal computer (PC). The system can be practiced with other communications, data processing, or computer system configurations, including: Internet appliances, handheld devices (including tablet computers and/or personal digital assistants (PDAs)), IoT devices, all manner of cellular or mobile phones, multi-processor systems, microprocessor-based or programmable consumer electronics, set-top boxes, network PCs, mini-computers, mainframe computers, and the like. Indeed, the terms "computer," "host" and "host computer," and "mobile device" and "handset" are generally used interchangeably herein and refer to any of the above devices and systems as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory, computer-readable storage media), including magnetically or optically readable computer discs, hard-wired or preprogrammed chips (e.g., Electrically Erasable Programmable Read-only Memory (EEPROM) semiconductor chips), nanotechnology memory, or other data storage media. Indeed, computer-implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer while corresponding portions reside on a client computer, such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device 310 and/or the cell sites 320, 325 can include network communication components that enable the devices to communicate with remote servers or other portable electronic devices by transmitting and receiving wireless signals using a licensed, semi-licensed, or unlicensed spectrum over a communications network, such as telecommunications network 330. In some cases, the telecommunications network 330 can be comprised of multiple networks, even multiple heterogeneous networks, such as one or more border networks, voice networks, broadband networks, service provider networks, Internet Service Provider (ISP) networks, and/or Public Switched Telephone Networks (PSTNs) interconnected via gateways operable to facilitate communications between and among the various networks. The telecommunications network 330 can also include third-party communications networks such as a GSM mobile communications network, a CDMA/TDMA mobile communications network, a 3G/4G mobile communications network (e.g., GPRS/EGPRS, EDGE, UMTS, or LTE network), 5G mobile communications network, WiFi, or other communications networks. Thus, the user device is configured to operate and switch among multiple frequency bands for receiving and/or transmitting data.

Further details regarding the operation and implementation of the contextual response system 350 will now be described.

Examples of Systems for Contextual Response Generation

Figure 3B:
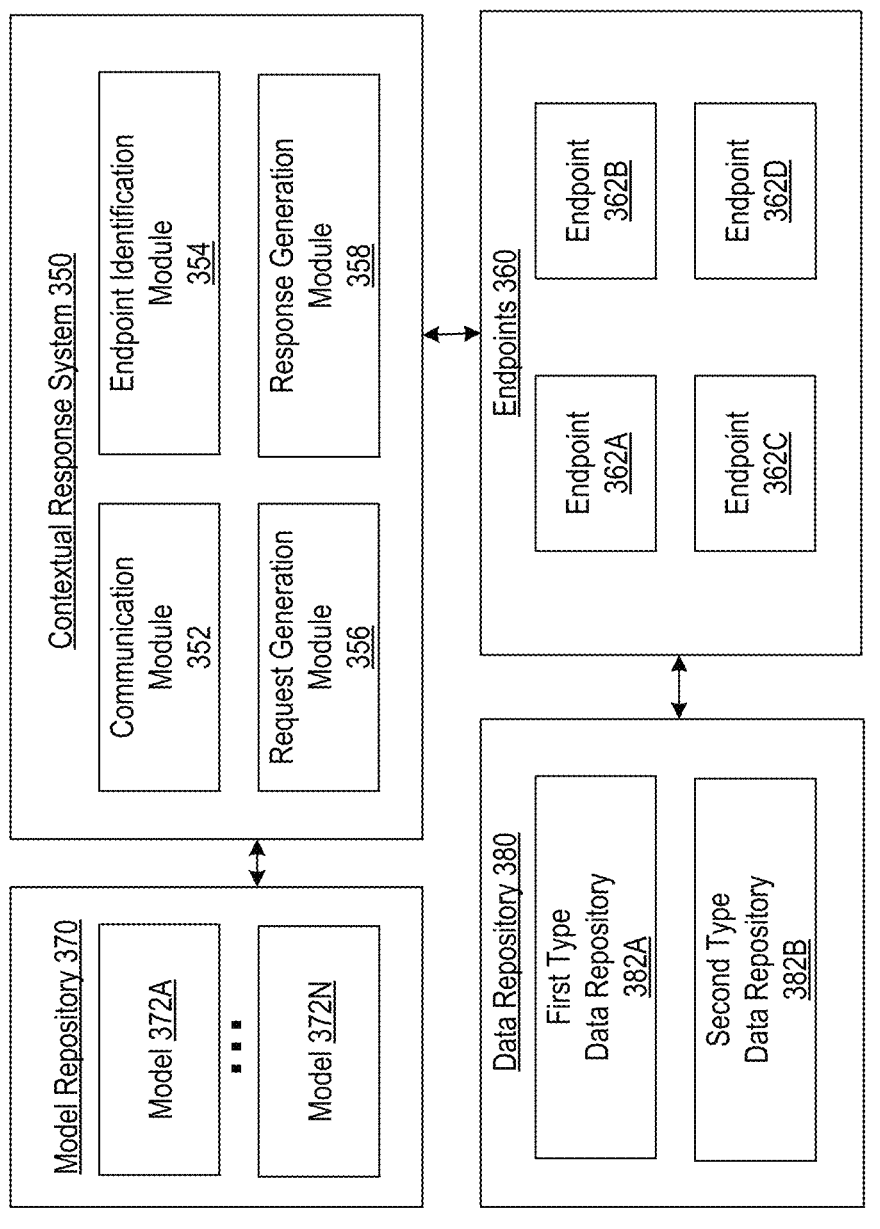
FIG. 3B is a block diagram illustrating the components of an exemplary contextual response system, in accordance with embodiments herein.

FIG. 3B is a block diagram illustrating the components of an exemplary contextual response system. Contextual response system 350 can include functional modules that are implemented with a combination of software (e.g., executable instructions or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the specific functions described herein. For example, the contextual response system 350 includes a communication module 352, an endpoint identification module 354, a request generation module 356, and a response generation module 358, each of which is discussed separately below.

Communication Module

Communication module 352 of contextual response system 350 can include software and/or hardware components allowing for the transmission and/or receipt of information between two or more devices. Communication module 352 can include a wireless communication module, such as a cellular radio or WiFi antenna, to allow for communication over wireless networks and/or can additionally or alternatively include a network card (e.g., a wireless network card and/or a wired network card) that is associated with software to drive the card.

The communication module 352 is configured and/or programmed (e.g., via the above-mentioned techniques) to interface between a device (e.g., user device(s) 310, one or more other user devices 355), cell sites (e.g., cell sites 320, 325), a content provider (e.g., content provider 340), and a cloud data repository (e.g., cloud data repository 345) such as via a network (e.g., telecommunications network 330) to receive and transmit data including values (e.g., time-series) for a set of network performance parameters. When communication module 352 receives data, the module can pass on relevant portions of data to different modules of the contextual response system 350. Communication module 352 can also be configured to generate and transmit notifications and/or recommendations to operators.

Communication module 352 may also be configured to enable communication between contextual response system 350 and various repositories and databases. In particular, communication module 352 may be used to access a suite of LLMs interfacing with a plurality of modular RAG endpoints, wherein each of the plurality of the modular RAG endpoints are configured to retrieve data from different parts of memory.

For example, in the example of FIG. 3B, contextual response system 350 may be in communication with model repository 370 and endpoints 360. For example, the contextual response system 350 may be enabled to execute models such as model 372A through model 372N in order to perform various functions such as identification of endpoints, generation of requests, and response generation. The models may be different types of machine learning models including, but not limited to, LLMs. The model repository 370 may store parameters of the models, which may be transmitted for execution on the contextual response system. Alternatively or additionally, the model repository may be stored on the same device as the contextual response system.

In some examples, the type of model that is executed and used by the contextual response system 350 may be identified by the user as part of the user parameters or session parameters. Alternatively or additionally, the contextual response system 350 may identify a suitable model from the repository based on query complexity or system capacity or capability.

Endpoints 360 such as endpoints 362A-362D may be in communication with contextual response system 350 through communication module 352 as well. Each of the endpoints 362A-362D may have access to different parts of memory, such as different databases or repositories that may store different corpora of information. In some examples, the data in each of the databases (e.g., repositories 382A-382B) of data repository 380 may overlap. In some examples, the databases may be for data that is only available to certain user types (e.g., first user type facing information, second user type facing information).

Figure 5:
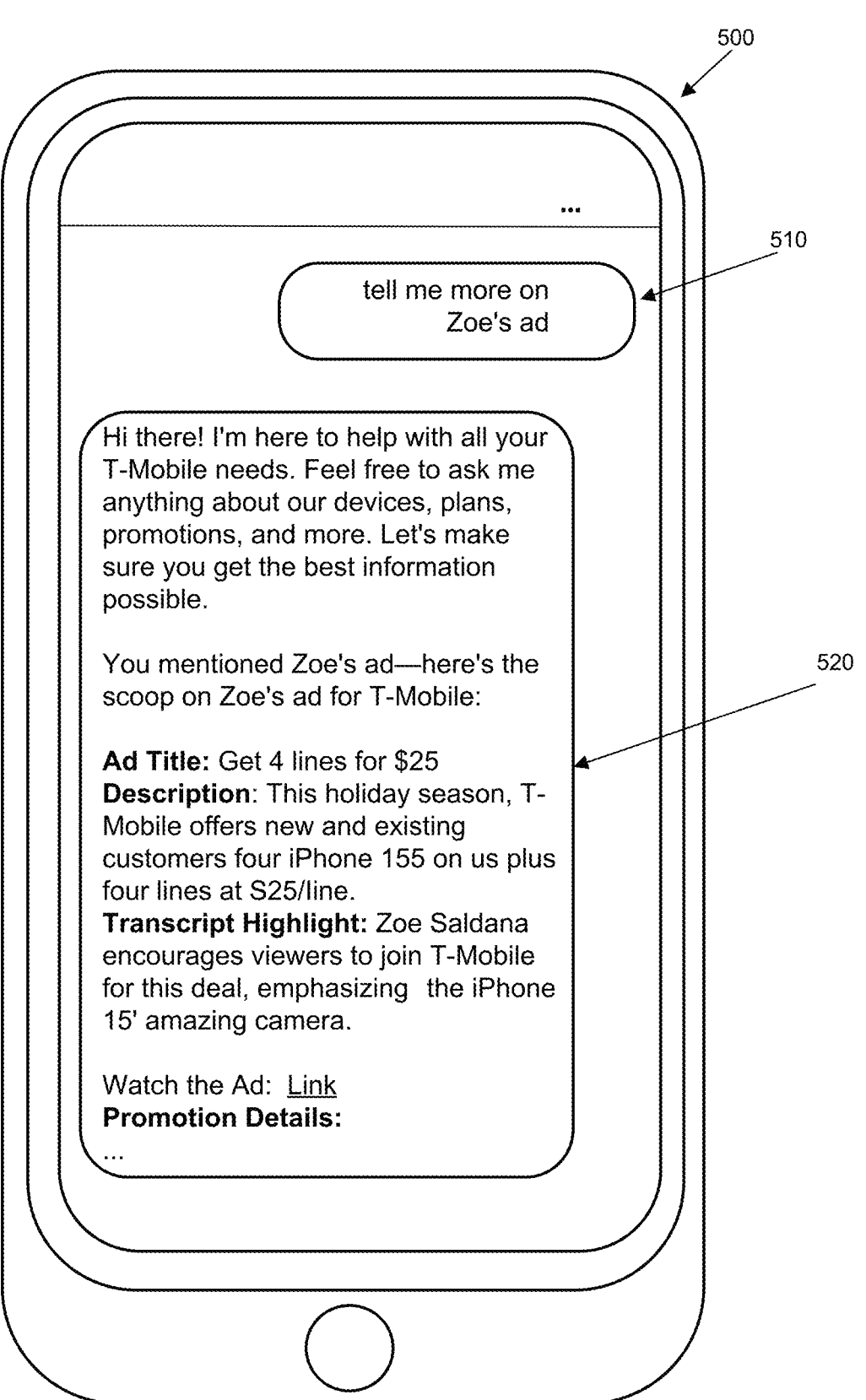
FIG. 5 is an illustrative user device including a user interface through which a user may query for data and receive retrieved responses, in accordance with embodiments herein.

As described herein, communication module 352 of the contextual response system 350 may receive a user query, such as from one or more users at a user device 310 or other user devices 355. In some embodiments, the user may transmit the query through interaction at an application. The application may send an API request to contextual response system 350. For example, the user may input a query through a chatbot or another conversational agent. In the example of FIG. 5, the user may input a query "tell me more on Zoe's ad," such as user query 510 on a mobile application on user device 500.

The query may be a request for retrieving data from memory during an API session and may include natural language text, including the input of the user, but may also include, or otherwise be transmitted alongside, other data such as user session data, user parameters, or device parameters that may be used to identify relevant RAG endpoints or customize the input for the specific user or user device. For example, the query may include session parameters specific to the API session. In some examples, the query may also include an image or audio, which may be preprocessed at the user device prior to transmission and reception at the communication module 352, e.g., through optical character recognition (OCR) or automatic speech recognition (ASR). Alternatively or additionally, the query may be preprocessed at contextual response system 350 (e.g., through OCR and/or ASR).

Once the model retrieves data from the relevant endpoints and synthesizes a response, the communication module may be used to communicate the response or to transmit an instruction for causing display of the response on the user device. In the example of FIG. 5, response 520 may be generated responsive to user query 510.

Endpoint Identification Module

The communication module 352 may pass the query data, or a pointer to the data in memory, to the endpoint identification module. The endpoint identification module may execute the selected model, e.g., an LLM, and input the query and the session parameters into the model, wherein the model is configured to identify, based on context of the query, at least one modular RAG endpoint configured to retrieve data related to the query. As referenced herein, modular RAG endpoints refer to RAG endpoints that can be independently created, modified, replaced, or upgraded without affecting the entire system or other RAG endpoints. Doing so enables flexibility and scalability without significant overhaul and overhead in updating the system, which can be computationally expensive and resource-intensive. As described herein, the model may be selected by the user or may be selected dynamically based on the query or system capacity and/or capability.

For example, the machine learning model may tokenize the query, perform processing such as stop word removal, stemming, and/or lemmatization to reduce words to their base form, and remove common words that do not add to the query. In another example, the model may perform term frequency-inverse document frequency (TF-IDF) to compute the importance of each word in the query relative to a larger corpus to help identify words that are unique to the query and likely to be relevant topics. In some examples, the model may use the session parameters, including device type, previous queries, etc., to add context to the user's current query. For example, if a user queries "Can I use 5G on my phone," the system may identify the device type as having certain specifications such as certain antenna types, etc.

According to some examples, responsive to receiving the request, the endpoint identification module may determine a user type based on data from the API session and the session parameters. Based on the user type, the module may determine a first portion of memory (e.g., one or more datasets, repositories, and/or databases) that a user is enabled to retrieve data from and a second portion of memory (e.g., one or more datasets, repositories, and/or databases) that a user is not permitted to access. The module may then determine, based on the first portion of memory and the second portion of memory, one or more modular RAG endpoints of the plurality of modular RAG endpoints to suspend for the user. For example, in an application for telecommunications, if the user is an external customer, the user may not be able to access data stores (e.g., datasets, repositories, and/or databases) having internal documents or non-finalized documents. In this example, the endpoint identification module may exclude endpoints corresponding to data stores having such documents. However, if the user is part of an internal team at the entity, the user may be entitled to access information at any database, and so no endpoints may be excluded.

Figure 4:
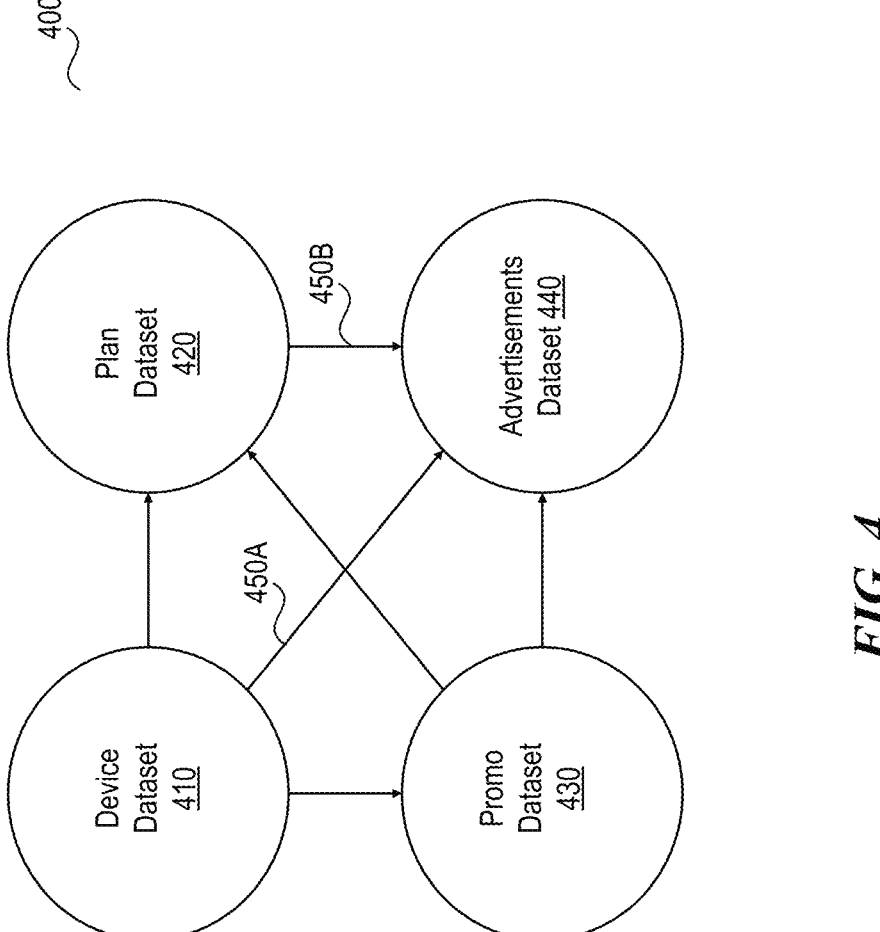
FIG. 4 is a block diagram illustrating an exemplary data structure storing relationships between different datasets, in accordance with embodiments herein.

As described herein, the model may initially identify one or more endpoints but may reference a data structure to identify other relevant endpoints to request information from. For example, FIG. 4 is an example of a representation of a data structure as a graph 400 including nodes and edges. The nodes may be representative of different endpoints or different knowledge bases corresponding to different endpoints. In the example of FIG. 4, datasets (e.g., repositories) "Device Dataset," "Plan Dataset," "Promo Dataset," and "Advertisements Dataset" are represented as nodes, including node 410, node 420, node 430, and node 440, respectively.

The edges between the nodes (e.g., edge 450A and edge 450B) may represent the existence of a relationship or link between the nodes. In some examples, the system may determine, based on whether or not the initially identified endpoints have edges or links relating the endpoints to others that are related, whether or not to request data from those endpoints as well. In some examples, the system may determine the distance between an initial node and another node (e.g., the number of edges in the shortest path between them) and only consider or request data from nodes that have a minimum distance under a predetermined threshold. In some examples, if not enough endpoints are found, the system may increase the distance value of the predetermined threshold iteratively until it has at least a minimum number of endpoints to query.

According to some embodiments, the edges may have values such as relevance scores indicating how strong of a relationship or association an endpoint has with another endpoint. For example, if edges are found to have a high numeric value or have a text string value indicating a strong association between endpoints, the model may identify those endpoints as additional endpoints to request information from. The value of the edges (e.g., relevance score) between nodes representing endpoints may be calculated based on similarity of the topic and on user type. For example, the value or existence of the edges can be made manually, e.g., by an operator, or may be calculated by a different model configured to identify similarities in text in the knowledge databases that the corresponding endpoints have access to.

In some embodiments, the edges may be directional, such that where a first endpoint has a directional edge to a second endpoint when the model identifies a first endpoint and references the data structure, a second endpoint is required or suggested, but when the model identifies a second endpoint and references the data structure, the first endpoint is not required or suggested. For example, if the model identifies "Device Dataset" first, the model may consider, based on the data structure, whether there are directional edges pointing the node to other nodes. In this case, one such directional edge is edge 450A, which points to "Advertisements Dataset," indicating that the endpoint corresponding to advertisement dataset is linked to the endpoint corresponding to the device dataset. The system may request data from both. In some cases, the system may require that nodes corresponding with endpoints having an immediate link (e.g., a distance of 1) with another node (e.g., corresponding to another endpoint) are required to be queried.

According to some embodiments, the data structure with the links may be updated periodically. For example, the data structure may be updated manually by operators having access or may be updated automatically responsive to an indication that a RAG endpoint or knowledge base corresponding to a RAG endpoint has been updated.

Responsive to endpoint identification module 354 identifying one or more RAG endpoints and, in some examples, identifying, using the data structure, one or more associated modular RAG endpoints linked to the at least one modular RAG endpoint, the endpoint identification module may pass identifiers, or pointers in memory to the identifiers, for the RAG endpoints to the request generation module 356. Request generation module 356 may be configured to retrieve a schema comprising a format for requesting data at the RAG endpoint(s), and the schema may be specific to the RAG endpoint(s).

Request Generation Module

As described herein, responsive to endpoint identification module 354 identifying RAG endpoints and, in some examples, identifying additional, associated modular RAG endpoints linked to the at least one modular RAG endpoint, the endpoint identification module may pass data identifying the RAG endpoints to the request generation module 356. Request generation module 356 may be configured to retrieve a schema comprising a format for requesting data at the RAG endpoint(s), and the schema may be specific to the RAG endpoint(s).

The schema may include, for example, one or more inputs of the at least one modular RAG endpoint, data types accepted for the one or more inputs, and/or an exemplary string for a permitted request to the at least one modular RAG endpoint. The schema may be unique to the RAG endpoint.

The machine learning model may then generate one or more requests for data for each of the identified RAG endpoints, such as through using function calling capabilities of the model. For example, the function calling capabilities may be used to make external calls to RAG endpoints. The requests may conform to each schema for the one or more RAG endpoints using the query and the model. Once the requests are generated, the requests may be passed to the relevant endpoints via communication module 352. Once the RAG endpoints retrieve the relevant information, the RAG endpoints may transmit the data. The communication module 352 may receive the data from the different RAG endpoints and pass the data, or a pointer to the data in memory, to the response generation module 358.

The RAG endpoints may be configured to perform one or more functions such as keyword searching, filtering of search results, or ranking of search results. In the example where a user posits a query "what's the cheapest 5G phone?" the model can call functions to search product data to identify phones that are 5G-compatible, retrieve the prices of the phones that are 5G-compatible, rank the results based on price, and output the result with the lowest price. The model may be configured to identify the steps that need to be taken and may call on RAG endpoints enabled to perform those functions.

As described herein, the endpoint identification module may also retrieve schema comprising formats for requesting data at one or more associated RAG endpoints, where each of the plurality of schema is specific to each of the one or more associated modular RAG endpoints. The request generation module may then generate requests for data, using function calling capabilities of the LLM, wherein the request conforms to the schema for the associated modular RAG endpoints using the query and the model. Responsive to transmitting the requests for data, the system may receive additional requested data that may be used to generate a contextualized user response.

Response Generation Module

The response generation module may receive the requested data or the pointer to the requested data in memory and use the model to generate a contextualized user response. For example, the model may synthesize and integrate the data from each of the endpoints to generate the user response. In some examples, the system may use user data, such as a user's name, to customize and contextualize the response in the context of the previous conversation history to best present the information. The model may also perform formatting functions to generate the response to fit a specific guideline for the response based on the hosting entity's preferences (e.g., using a style guide).

Once the response is generated, the system may cause display, via the API, of the contextualized user response, e.g., by transmitting an instruction for causing the user device to display the response via the communication module 352. One such example of a response is response 520 of FIG. 5.

Flow Diagram

FIG. 6 is a flow diagram illustrating a process for contextual response retrieval using endpoints, in accordance with embodiments herein. Process 600 begins at block 602 where a system (e.g., such as contextual response system 350) accesses a suite of model-based agents interfacing with a plurality of RAG endpoints (as discussed above in reference to the communication module 352).

At block 604, process 600 includes receiving, from a user via an API, (a) a query and (b) session parameters (as discussed above in reference to the communication module 352). Process 600 then proceeds to block 606, where the system inputs the query and the session parameters into a model configured to identify at least one RAG endpoint (as discussed above in reference to the endpoint identification module 354). At block 608, process 600 retrieves a schema specific to the at least one RAG endpoint responsive to identifying the at least one RAG endpoint. The process proceeds to block 610, where the system generates a request for data using function calling capabilities of the model conforming to the schema (as discussed above in reference to the request generation module 356). At block 612, the system receives the requested data, after which the system may generate a response.

Computer System

Figure 7:
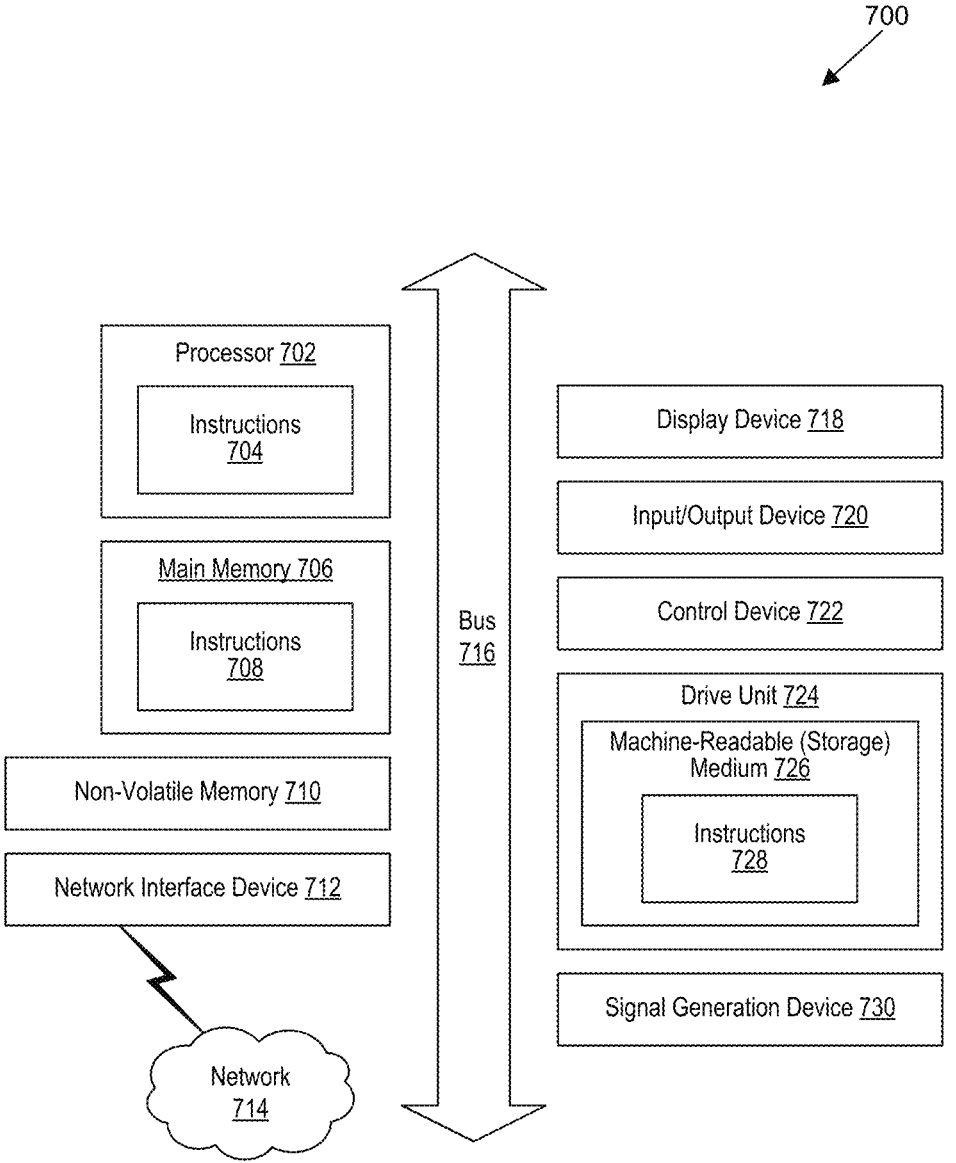
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 shares a similar architecture as that of a server computer, PC, tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computing system 700. In some implementations, the computer system 700 can be an embedded computer system, a system-on-chip (SOC), a single-board computer (SBC) system or a distributed system such as a mesh of computer systems, or include one or more cloud components in one or more networks. Where appropriate, one or more computer systems 700 can perform operations in real time, near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable (storage) medium 726) can be local, remote, or distributed. Although shown as a single medium, the machine-readable (storage) medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable (storage) medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for retrieving information using a modular endpoint system, the computer-implemented method comprising:

accessing a suite of large-language model (LLM)-based agents that interface with a plurality of modular retrieval augmented generation (RAG) endpoints, wherein each of the plurality of the modular RAG endpoints are configured to retrieve data from different parts of memory and are configured to perform one or more data retrieval functions;

receiving, from a user via an application programming interface (API), (a) a query for retrieving data from the memory during an API session and (b) session parameters specific to the API session;

inputting the query and the session parameters into a large-language model, wherein the large-language model is configured to identify, based on context of the query, at least one modular RAG endpoint configured to retrieve data related to the query;

responsive to identifying the at least one modular RAG endpoint, retrieving a schema comprising a format for requesting data at the at least one modular RAG endpoint, wherein the schema is specific to the at least one modular RAG endpoint;

generating a request for data, using function calling capabilities of the large-language model, wherein the request conforms to the schema for the at least one modular RAG endpoint using the query and the large-language model and calls a data retrieval function of the at least one modular RAG endpoint; and responsive to transmitting the request for data, receiving the requested data.

2. The computer-implemented method of claim 1, further comprising:

generating, through the large-language model using the requested data from the at least one modular RAG endpoint, a contextualized user response; and displaying, via the API, the contextualized user response.

3. The computer-implemented method of claim 1, further comprising:

responsive to receiving the request, determining a user type based on data from the API session and the session parameters;

determining, based on the user type, a first portion of memory that a user is enabled to retrieve data from and a second portion of memory that a user is not permitted to access; and determining, based on the first portion of memory and the second portion of memory, one or more modular RAG endpoints of the plurality of modular RAG endpoints to suspend for the user.

4. The computer-implemented method of claim 1, wherein the schema comprises (a) one or more inputs of the at least one modular RAG endpoint, (b) data types accepted for the one or more inputs, and (c) an exemplary string for a permitted request to the at least one modular RAG endpoint.

5. The computer-implemented method of claim 1, wherein the plurality of modular RAG endpoints are configured to retrieve data in different parts of memory organized by topic and user type and wherein the computer-implemented method further comprises:

responsive to identifying the at least one modular RAG endpoint, accessing a data structure storing one or more links between different modular RAG endpoints based on a relevance score between the plurality of modular RAG endpoints; and identifying, using the data structure, one or more associated modular RAG endpoints linked to the at least one modular RAG endpoint.

6. The computer-implemented method of claim 5, further comprising:

retrieving a plurality of schema comprising formats for requesting data at the one or more associated modular RAG endpoints, wherein each of the plurality of schema is specific to each of the one or more associated modular RAG endpoints;

generating requests for data, using function calling capabilities of the large-language model, wherein the requests conform to the schema for the one or more associated modular RAG endpoints using the query and the large-language model;

responsive to transmitting the requests for data, receiving additional requested data;

generating, through the large-language model using the requested data and additional requested data, a contextualized user response; and causing display, via the API, of the contextualized user response.

7. The computer-implemented method of claim 5, wherein the relevance score between the different modular RAG endpoints is calculated based on similarity of the topic on and user type.

8. One or more non-transitory, computer-readable media containing instructions that, when executed by a processor, perform a method for retrieving information using a modular endpoint system, the method comprising:

accessing a suite of LLM-based agents that interface with a plurality of RAG endpoints, wherein each of the plurality of RAG endpoints are configured to retrieve data from different parts of memory and are configured to perform one or more data retrieval functions;

receiving, from a user via an application programming interface (API), (a) a query for retrieving data from the memory during an API session and (b) session parameters specific to the API session;

inputting the query and the session parameters into a large-language model, wherein the large-language model is configured to identify, based on context of the query, at least one RAG endpoint configured to retrieve data related to the query;

responsive to identifying the at least one RAG endpoint, retrieving a schema comprising a format for requesting data at the at least one RAG endpoint, wherein the schema is specific to the at least one RAG endpoint;

generating a request for data, using function calling capabilities of the large-language model, wherein the request conforms to the schema for the at least one RAG endpoint using the query and the large-language model and calls a data retrieval function of the at least one modular RAG endpoint; and responsive to transmitting the request for data, receiving the requested data.

9. The one or more non-transitory, computer-readable media of claim 8, wherein the method further comprises:

generating, through the large-language model using the requested data from the at least one RAG endpoint, a contextualized user response; and causing display, via the API, of the contextualized user response.

10. The one or more non-transitory, computer-readable media of claim 8, wherein the method further comprises:

responsive to receiving the request, determining a user type based on data from the API session and the session parameters;

determining, based on the user type, a first portion of memory that a user is enabled to retrieve data from and a second portion of memory that a user is not permitted to access; and determining, based on the first portion and the second portion of memory, one or more modular RAG endpoints of the plurality of RAG endpoints to suspend for the user.

11. The one or more non-transitory, computer-readable media of claim 8, wherein the schema comprises (a) one or more inputs of the at least one RAG endpoint, (b) data types accepted for the one or more inputs, and (c) an exemplary string for a permitted request to the at least one RAG endpoint.

12. The one or more non-transitory, computer-readable media of claim 8, wherein the plurality of RAG endpoints are configured to retrieve data in different parts of memory organized by topic and user type and wherein the method further comprises:

responsive to identifying the at least one RAG endpoint, accessing a data structure storing one or more links between different RAG endpoints based on a relevance score between different RAG endpoints; and identifying, using the data structure, one or more associated RAG endpoints linked to the at least one RAG endpoint.

13. The one or more non-transitory, computer-readable media of claim 12, wherein the method further comprises:

retrieving a plurality of schema comprising formats for requesting data at the one or more associated RAG endpoints, wherein each of the plurality of schema is specific to each of the one or more associated RAG endpoints;

generating requests for data, using function calling capabilities of the large-language model, wherein the requests conform to the schema for the one or more associated RAG endpoints using the query and the large-language model;

responsive to transmitting the requests for data, receiving additional requested data;

generating, through the large-language model using the requested data and additional requested data, a contextualized user response; and causing display, via the API, of the contextualized user response.

14. The one or more non-transitory, computer-readable media of claim 12, wherein the relevance score between the different modular RAG endpoints is calculated based on similarity of the topic and on user type.

15. A system for retrieving information using a modular endpoint system, the system comprising:

one or more processors; and one or more non-transitory, computer-readable media storing instructions that, when executed by the one or more processors, cause operations comprising:

accessing a suite of LLM-based agents that interface with a plurality of RAG endpoints, wherein each of the plurality of RAG endpoints are configured to retrieve data from different parts of memory and are configured to perform one or more data retrieval functions;

receiving, from a user via an application programming interface (API), (a) a query for retrieving data from the memory during an API session and (b) session parameters specific to the API session;

inputting the query and the session parameters into a large-language model, wherein the large-language model is configured to identify, based on context of the query, at least one RAG endpoint configured to retrieve data related to the query;

responsive to identifying the at least one RAG endpoint, retrieving a schema comprising a format for requesting data at the at least one RAG endpoint, wherein the schema is specific to the at least one RAG endpoint;

generating a request for data, using function calling capabilities of the large-language model, wherein the request conforms to the schema for the at least one RAG endpoint using the query and the large-language model and calls a data retrieval function of the at least one modular RAG endpoint; and responsive to transmitting the request for data, receiving the requested data.

16. The system of claim 15, wherein the one or more non-transitory, computer-readable media further cause operations comprising:

generating, through the large-language model using the requested data from the at least one RAG endpoints, a contextualized user response; and causing display, via the API, of the contextualized user response.

17. The system of claim 15, wherein the one or more non-transitory, computer-readable media further cause operations comprising:

responsive to receiving the request, determining a user type based on data from the API session and the session parameters;

determining, based on the user type, a first portion of memory that a user is enabled to retrieve data from and a second portion of memory that a user is not permitted to access; and determining, based on the first portion and the second portion of memory, one or more RAG endpoints of the plurality of RAG endpoints to suspend for the user.

18. The system of claim 15, wherein the schema comprises (a) one or more inputs of the at least one RAG endpoint, (b) data types accepted for the one or more inputs, and (c) an exemplary string for a permitted request to the at least one RAG endpoint.

19. The system of claim 15, wherein the plurality of RAG endpoints are configured to retrieve data in different parts of memory organized by topic and user type and wherein the one or more non-transitory, computer-readable media further cause operations comprising:

responsive to identifying the at least one RAG endpoint, accessing a data structure storing one or more links between different RAG endpoints based on a relevance score between the RAG endpoints; and identifying, using the data structure, one or more associated RAG endpoints linked to the at least one RAG endpoint.

20. The system of claim 19, wherein the one or more non-transitory, computer-readable media further cause operations comprising:

retrieving a plurality of schema comprising formats for requesting data at the one or more associated RAG endpoints, wherein each of the plurality of schema is specific to each of the one or more associated RAG endpoints;

generating requests for data, using function calling capabilities of the large-language model, wherein the requests conform to the schema for the one or more associated RAG endpoints using the query and the large-language model;

responsive to transmitting the requests for data, receiving additional requested data;

generating, through the large-language model using the requested data and additional requested data, a contextualized user response; and causing display, via the API, of the contextualized user response.

\* \* \* \* \*